(12) United States Patent
Kallioinen et al.

(10) Patent No.: US 11,076,624 B2
(45) Date of Patent: Aug. 3, 2021

(54) METHOD FOR PRODUCING A MILK-BASED PRODUCT

(71) Applicant: VALIO LTD, Helsinki (FI)

(72) Inventors: Harri Kallioinen, Haarajoki (FI); Saara Lähtevänoja, Tolkkinen (FI)

(73) Assignee: VALIO LTD., Helsinki (FI)

( * ) Notice: Subject to any disclaimer, the term of this patent is extended or adjusted under 35 U.S.C. 154(b) by 877 days.

(21) Appl. No.: 15/550,588

(22) PCT Filed: Feb. 11, 2016

(86) PCT No.: PCT/FI2016/050089
§ 371 (c)(1),
(2) Date: Aug. 11, 2017

(87) PCT Pub. No.: WO2016/128623
PCT Pub. Date: Aug. 18, 2016

(65) Prior Publication Data
US 2018/0027864 A1   Feb. 1, 2018

(30) Foreign Application Priority Data
Feb. 12, 2015  (FI) .................................... 20155096

(51) Int. Cl.
*A23L 33/00* (2016.01)
*A23C 3/02* (2006.01)
(Continued)

(52) U.S. Cl.
CPC ................ *A23L 33/40* (2016.08); *A23C 3/02* (2013.01); *A23C 9/1206* (2013.01);
(Continued)

(58) Field of Classification Search
CPC . A23L 33/40; A23L 33/19; A23C 3/02; A23C 9/1206; A23C 9/1422; A23C 9/1425; A23C 9/206
(Continued)

(56) References Cited

U.S. PATENT DOCUMENTS

2011/0097442 A1    4/2011  Harju et al.
2012/0015082 A1*   1/2012  Holst et al.
(Continued)

FOREIGN PATENT DOCUMENTS

CN     102291993 A   12/2011
CN     102595915 A    7/2012
(Continued)

OTHER PUBLICATIONS

Search Report dated May 10, 2018 issued in Russian Application No. 2017131589 with English translation (5 pages).
(Continued)

*Primary Examiner* — Helen F Heggestad
(74) *Attorney, Agent, or Firm* — Robert P. Michal, Esq.; Carter, DeLuca & Farrell LLP

(57) ABSTRACT

The invention relates to a method for producing a milk-based product, comprising the steps of: providing a milk raw material; altering a ratio of casein to total protein of the milk raw material to less than about 0.80; subjecting the milk raw material with the altered ratio of casein to total protein from step b) to a heat treatment at the temperature of at least about 150° C. for a period of at most about 0.3 sec; cooling the heat-treated milk raw material from step c) to provide the milk-based product. The method provides milk-based products with long shelf life and good organoleptic properties.

23 Claims, 4 Drawing Sheets

(51) Int. Cl.
  *A23C 9/142*  (2006.01)
  *A23C 9/20*   (2006.01)
  *A23L 33/19*  (2016.01)
  *A23C 9/12*   (2006.01)

(52) U.S. Cl.
  CPC .......... *A23C 9/1422* (2013.01); *A23C 9/1425* (2013.01); *A23C 9/206* (2013.01); *A23L 33/19* (2016.08); *A23C 2210/20* (2013.01); *A23C 2210/25* (2013.01); *A23C 2210/252* (2013.01); *A23V 2002/00* (2013.01)

(58) Field of Classification Search
  USPC .......... 426/491, 580, 583, 34, 41, 42, 52, 63
  See application file for complete search history.

(56) References Cited

U.S. PATENT DOCUMENTS

| | | | |
|---|---|---|---|
| 2013/0064923 A1 | 3/2013 | Remondetto et al. | |
| 2013/0142904 A1* | 6/2013 | Holst et al. | |
| 2013/0251884 A1* | 9/2013 | Langrish et al. | |
| 2013/0287892 A1* | 10/2013 | Knights | |
| 2014/0302219 A1* | 10/2014 | Tikanmaki et al. | |

FOREIGN PATENT DOCUMENTS

| | | |
|---|---|---|
| CN | 103118542 A | 5/2013 |
| CN | 103945700 A | 7/2014 |
| CN | 104284597 A | 1/2015 |
| EP | 2 783 573 A2 | 10/2014 |
| WO | WO 2008/002492 | 1/2008 |
| WO | WO 2009/000972 | 12/2008 |
| WO | WO 2010/085957 | 8/2010 |
| WO | WO 2012/010699 | 1/2012 |
| WO | 2013/068653 A2 | 5/2013 |
| WO | 2014/114709 A2 | 7/2014 |
| WO | WO 2014/163485 | 10/2014 |

OTHER PUBLICATIONS

Office Action dated May 15, 2018 issued in Russian Application No. 2017131589 with English translation (7 pages).
International Search Report for PCT/FI2016/050089, dated Jun. 1, 2016, 5 pages.
Written Opinion for PCT/FI2016/050089, dated Jun. 1, 2016, 6 pages.
Search Report for FI 20155096, dated Oct. 12, 2015, 2 pages.
Rysstad et al., "Extended shelf life milk—advances in technology", International Journal of Dairy Technology, vol. 59, No. 2, May 2, 2006, pp. 85-96.
Bastian et al., "Plasmin in Milk and Dairy Products: an Update", International Dairy Journal, vol. 6, No. 5, May 1, 1996, pp. 435-457.
Corassin, C.H. et al., "Relationship between plasmin activity and casein fractions during storage of UHT milk", Brazilian Journal of Food Technology, 2013, vol. 16, No. 1, pp. 29-33.
Rauh V. M. et al., "Plasmin Activity in UHT Milk: Relationship between Proteolysis, Age Gelation, and Bitterness", Journal of Agricultural and Food Chemistry, 2014, vol. 62, pp. 6852-6860.
Rauh, V. M. et al., "Plasmin activity as a possible cause for age gelation in UHT milk produced by direct steam infusion", International Dairy Journal, 2014, vol. 38, No. 2, pp. 199-207.
Crudden, A. et al., "Factors affecting the hydrolytic action of plasmin in milk", International Dairy Journal, 2005, vol. 15, pp. 305-313.
"Milk and milk products—Determination of furosine content—Ion-pair reverse-phase high-performance liquid chromatography method", International Standard, ISO 18329, IDF 193, First Edition Oct. 15, 2004, 17 pages.
Korycka-Dahl, et al., "Plasmin Activity in Milk", Laboratoire de Biochimie at Technologic Laitières and Laboratoire de Physiologie de la Lactation, Institut de la Recherche Agronomique, Journal of Dairy Science, 1983, vol. 66, No. 4, pp. 704-711.
Laemmli, "Cleavage of Structural Proteins during the Assembly of the Head of Bacteriophae T4", MRC Laboratory of Molecular Biology, Nature, vol. 227, Aug. 15, 1970, pp. 680-685.
Matsubara et al., "Crystalline Bacterial Proteinase", The Journal of Biochemistry, vol. 45, No. 4, 1958, pp. 251-258.
Syväoja et al., "Determination of Colostral Immunoglobulins by Gel Filtration Chromatography", International Dairy Federation, 1994, pp. 216-219.
Saint Denis et al., "Heat inactivation of native plasmin, plasminogen and plasminogen activators in bovine milk: a revisited study", Lait 81, 2001, pp. 715-729.
Fox et al., "Molecular characteristics of plasmin and plasminogen", Plasmin System in Milk, Advanced Dairy Chemistry, vol. 1—Proteins, 10 pages, 2003.
Metwalli et al., "Heat Inactivation of Bovine Plasmin", Int. Dairy Journal (8), 1998, pp. 47-56.
Asselt et al., "Extreme high-temperature treatment of milk with respect to plasmin inactivation", International Dairy Journal 18, 2008, pp. 531-538.
Chinese Office Action issued by the Chinese Patent Office in relation to Chinese Application No. 201680018566.4 dated Mar. 27, 2020 (9 pages) along with English language translation (5 pages).
Dairy Processing Handbook, Publisher: Tetra Pak Processing Systems AB S-221 86 Lund, Sweden; published in 1995, 1-436.†
Van Asselt, A.J., Extreme high-temperature treatment of milk with respect to plasmin inactivation, International Dairy Journal 18, 2008, 531-538.†
Denis, T.S., Heat inactivation of native plasmin, plasminogen and plasminogen activators in bovine milk: a revisited study, Lait 81, 2001, 715-729.†
Fox & McSweeny, Advanced Dairy Chemistry, vol. 1, Protiens, Part A, 3rd edition, 2003, 496-521.†
Metwalli, A.A.M. et al., Heat Inactivation of Bovine Plasmin, Int. Dairy Journal 8, 1998, 47-56.†

\* cited by examiner
† cited by third party

METHOD FOR PRODUCING A MILK-BASED PRODUCT This application is the U.S. national phase of International Application No. PCT/FI2016/050089 filed 11 Feb. 2016, which designated the U.S. and claims priority to FI Patent Application No. 20155096 filed 12 Feb. 2015, the entire contents of each of which are hereby incorporated by reference.

FIELD OF THE INVENTION

The present invention relates to a method for producing milk-based products. The method provides milk-based products with long shelf life in which good organoleptic properties are retained.

BACKGROUND OF THE INVENTION

Ultra high temperature (UHT) treatment is a well-known process in the dairy field to provide milk products with extended shelf life at ambient temperatures. The UHT treatment is typically carried out at a temperature of 135° C. or above and in a time period of more than 1 sec. The UHT treatment destroys pathogenic and spoilage microbes and their spores in milk. However, the UHT treatment does not necessarily inactivate enzymes included in milk which can be naturally present in milk or derived from microbes. An example of these enzymes is a natural protease, i.e. plasmin, which causes bitter taste to milk. Thus, plasmin has to be sufficiently inactivated in order to retain good organoleptic properties of milk during the whole selling period. Plasmin enzyme is heat-stable and can be inactivated only by a severe heat treatment, such as by a prolonged heat treatment. Prolonged heat treatment again has an adverse effect on the organoleptic properties of milk, the milk typically having a strong cooked or even burnt flavour. Hence, the presence of plasmin generally impairs the organoleptic properties of a milk product, especially when stored at an ambient temperature for a prolonged period.

WO 2010/085957 A1 discloses a method for producing long shelf life milk products, wherein milk is subjected to physical separation of microorganisms and a high temperature treatment at 140-180° C. for a period of at most 200 msec.

WO 2012/010699 A1 discloses a method for producing long shelf life milk products with a reduced lactose content, wherein lactose-reduced milk is subjected to a high temperature treatment at 140-180° C. for a period of at most 200 msec.

WO 2009/000972 A1 discloses a process for producing well-preserving low-lactose or lactose-free milk products. Proteins and sugars of milk are first separated into different fractions, and then ultra high temperature treated separately. After the UHT treatment, the fractions are recombined. It is reported that the plasmin enzyme system can be inactivated and Maillard browning reactions can be avoided, whereby defects in taste, colour and structure of the UHT treated milk products can be avoided.

There is a need for a simple, efficient and economic process for preparing long shelf life milk products which are completely flawless in taste.

BRIEF DESCRIPTION OF THE INVENTION

An object of the present invention is to provide a method for producing a milk-based product, comprising the steps of:

a) providing a milk raw material;
b) altering a ratio of casein to total protein of the milk raw material to less than about 0.80, or about 0.70 or less, or about 0.60 or less, or about 0.50 or less, or about 0.40 or less, or about 0.20 or less;
c) subjecting the milk raw material with the altered ratio of casein to total protein from step b) to a heat treatment at the temperature of at least about 150° C., specifically at least about 155° C., more specifically at least about 157° C., for a period of at most about 0.3 sec;
d) cooling the heat-treated milk raw material from step c) to provide the milk-based product.

The invention provides a method by which the plasmin enzyme activity of milk is significantly decreased. The milk-based product prepared by the method has flawless organoleptic properties and an extended shelf life at ambient temperatures. The method of the invention is simple, efficient and economic.

It was surprisingly found that the protease, i.e. plasmin enzyme, activity of milk is inactivated by altering a natural proportion of casein to total protein content in milk so that the content of whey protein in respect to casein is increased. Although the whey protein content of the milk-based product is increased, no defects in organoleptic properties, such as cooked taste, are detected.

DETAILED DESCRIPTION OF THE INVENTON

Figure 1:
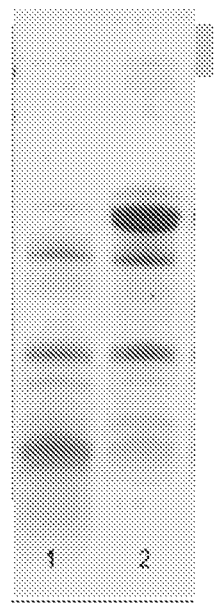
FIG. 1 is a SDS page showing protein profiles of skim milk having a native casein/total protein ratio of 0.80 after storage for 50 days at a room temperature and at <6° C.

An object of the present invention is to provide a method for producing a milk-based product, comprising the steps of:

a) providing a milk raw material;
b) altering a ratio of casein to total protein of the milk raw material to less than about 0.80, or about 0.70 or less, or about 0.60 or less, or about 0.50 or less, or about 0.40 or less, or about 0.20 or less;
c) subjecting the milk raw material with the altered ratio of casein to total protein from step b) to a heat treatment at the temperature of at least about 150° C., specifically at least about 155° C., more specifically at least about 157° C., for a period of at most about 0.3 sec;
d) cooling the heat-treated milk raw material from step c) to provide the milk-based product.

In the present invention, the term "milk raw material" may be milk as such obtained from an animal, such as a cow, sheep, goat, camel, mare or any other animal that produces milk suitable for human consumption, or any liquid component derived therefrom, such as whey;

the term "whey" means a liquid separated from milk, in which a substantial portion of milk fat and casein are removed, except in the context of "whey protein". The term "whey protein" has an explicit meaning which is well-known to a person skilled in the art, and means a protein fraction of milk which does not precipitate at the pH 4.6. The term "whey" encompasses sweet whey and acid whey derived from cheesemaking or casein manufacture, and ideal whey obtained from various membrane filtrations of milk, such as microfiltration, ultrafiltration, nanofiltration, reverse osmosis, diafiltration, chromatography, crystallization or a combination thereof.

Milk can be pre-processed as desired to adjust fat and/or lactose content to a desired level. For example, the milk raw material can be standardized in respect of the fat content in a manner generally known in the art. Further, the milk raw material can be pretreated in order to lower its microbial load in a manner generally known in the art. Pathogenic and spoilage microorganisms removal is generally carried out by physical separation such as microfiltration, bactofugation or a combination thereof.

The milk raw material, optionally standardized (fat and/or lactose) and/or pretreated for microbial removal (microfiltration, bactofugation), can be subjected to a thermal treatment prior to alteration a ratio of casein to total protein. Examples of suitable thermal treatments include pasteurization, high pasteurization, or heating at a temperature lower than the pasteurization temperature for a sufficiently long time. Specifically, UHT treatment (e.g. milk at least at 138° C., 2 to 4 s), high pasteurization (e.g. milk at 130° C., 1 to 2 s), pasteurization (e.g. milk at 72° C., 15 s), thermisation (e.g. at 65° C., 2 s to 3 min) can be mentioned. The thermal treatment can be either direct (steam to milk, milk to steam) or indirect (tube heat exchanger, plate heat exchanger, scraped-surface heat exchanger).

If desired, the lactose content of the milk raw material can be reduced. In an embodiment, lactose content is reduced enzymatically by adding a lactase to the raw material. Lactases typically used in the lactose hydrolysis of milk can be used. The lactose content can also be reduced by other suitable means generally known in the art, such as by means of membrane filtration, chromatography, electrodialysis, crystallization, centrifugation, or precipitation. Various techniques can be combined in an appropriate manner. The low lactose raw material can be further lactose-hydrolyzed to provide a lactose-free milk raw material.

In the present invention, the milk raw material can thus be, for instance, full-fat (whole) milk, cream, low fat milk, skim milk, buttermilk, colostrum, low-lactose milk, lactose-free milk, whey protein depleted milk, Ca depleted milk, reconstituted (recombined) milk from milk powder, or a combination thereof as such or as a concentrate and pre-treated as described above, such as heat-treated.

In an embodiment, the milk raw material is derived from bovine milk.

The milk raw material can contain fat and/or protein of vegetable origin.

The ratio of casein to total protein of normal milk is typically 0.80. In accordance with the invention, a raw material derived from milk is provided in which the natural casein to total protein is altered to less than about 0.80. In an embodiment, the altered casein/total protein ratio is about 0.70 or less. In another embodiment, the altered ratio is about 0.60 or less. In still another embodiment, the altered ratio is about 0.50 or less. In a further embodiment, the altered ratio is about 0.40 or less. In a still further embodiment, the altered ratio is about 0.20 or less. This milk raw material with an altered casein to total protein ratio is then subjected to heat treatment conditions which are severe enough to inactivate the plasmin enzyme activity of milk.

The milk raw material with the altered casein/total protein ratio of less than about 0.80 can be prepared by combining various milk components and/or fractions, including but not limited to skim milk, cream, a milk protein concentrate, a casein concentrate and a whey protein concentrate, in suitable proportions. The milk raw material can also be any individual fraction or milk component having the altered casein/total protein ratio of less than about 0.80. The milk components and fractions can be available as commercial products or can be prepared by various separation techniques, including but not limited to membrane filtrations, chromatography, precipitation, centrifugation and evaporation. The milk protein concentrate can be conveniently obtained, for example, by concentrating milk by ultrafiltration. The casein and whey concentrates can be conveniently obtained, for example, by a method in which whey protein and casein of milk are separated by microfiltration to provide a casein concentrate as a microfiltration retentate and the whey protein concentrate as a microfiltration permeate. Casein and whey protein can also be separated from each other by chromatography. The milk components and various fractions derived from milk can be provided in the form from liquid to powder. There are casein and whey protein preparations which are commercially available and suitable for use in the present invention.

In an embodiment, the milk raw material with the altered casein/total protein ratio of less than about 0.80 comprises a whey protein concentrate, skim milk, cream and a milk protein concentrate.

In an embodiment, the whey protein concentrate is obtained by a method comprising the steps:
 i) subjecting milk to microfiltration (MF) to provide a MF permeate and a MF retentate;
 ii) subjecting the MF permeate to ultrafiltration (UF) to provide an UF permeate and the whey protein concentrate as an UF retentate.

The pore size of a membrane used in the microfiltration to separate casein and whey protein of milk is about 0.08 µm.

The microfiltration and ultrafiltration can be carried out at temperatures from about 1° C. to about 55° C. In an embodiment, the microfiltration is carried out at 10° C. to 15° C. In an embodiment, the ultrafiltration is carried out at 10° C. to 15° C.

Diafiltration can be used in the microfiltration and ultrafiltration to enhance the separation of casein and whey protein. In this context, diafiltration means a filtration process in which a retentate is diluted with water or permeate and re-filtered to reduce the concentration of soluble permeate components and to increase the concentration of retained components. Diafiltration also means a filtration process in which water or permeate is added to a material to be fed to a filtration.

After altering a ratio of casein to total protein of the milk raw material, the milk raw material is subjected to heat treatment at a temperature of at least about 150° C. for a period of at most about 0.3 sec. In an embodiment, the heat treatment is performed at a temperature of at least about 155° C. In an embodiment, the heat treatment is performed at a temperature of at least about 157° C.

In an embodiment, the heat treatment is performed for a period of at most about 0.2 sec. In another embodiment, the heat treatment is performed for a period of at most about 0.1 sec. In another embodiment, the heat treatment is performed at a temperature of at least about 150° C. for a period of at most about 0.2 sec. In still another embodiment, the heat treatment is performed at a temperature of at least of about 155° C. for a period of at most about 0.1 sec. In a further embodiment, the heat treatment is performed at 157° C. for 0.1 sec.

After the heat treatment, the milk raw material is cooled to provide a ready-to-use milk-based product.

The milk-based product produced by the method of the invention has an altered ratio of casein to total protein. In an embodiment, the altered casein/total protein ratio is less than about 0.80. In another embodiment, the altered casein/total protein ratio is about 0.70 or less. In still another embodiment, the altered ratio is about 0.60 or less. In a further embodiment, the altered ratio is about 0.50 or less. In a still further embodiment, the altered ratio is about 0.40 or less. In a still further embodiment, the altered ratio is about 0.20 or less.

The fat content of the milk-based product produced by the method of the invention is typically in the range of 0.05 to 10%, specifically 1.0 to 3.0%.

The protein content of the milk-based product produced by the method of the invention is at least of about 0.9%. In an embodiment, the protein content is about 0.9 to about 20%. In another embodiment, the protein content is about 1.3% to about 10%.

In an embodiment, the milk-based product has an increased protein content and altered casein/total protein ratio. In an embodiment, the protein content of the milk-based product is up to about 20%. In another embodiment, the protein content is up to about 10%. In an embodiment, the casein/total protein ratio of the milk-based product with increased protein content is about 0.70. In another embodiment, the casein/total protein ratio is about 0.40.

In an embodiment, the milk-based product has a protein content of about 3% of normal milk and altered casein/total protein ratio. In an embodiment, the casein/total protein ratio of the milk-based product with about 3% protein is about 0.70. In another embodiment, the casein/total protein ratio is about 0.50.

In an embodiment, the milk-based product has a reduced protein content and altered casein/total protein ratio. In an embodiment, the protein content is down to about 0.9%. In another embodiment, the protein content is less than about 3% of normal milk. In an embodiment, the casein/total protein ratio of the milk-based product with reduced protein content is about 0.40. In another embodiment, the casein/total protein ratio is about 0.20.

The milk-based product prepared by the method of the invention includes, but is not limited to, milk beverages with varied fat, protein and lactose contents, milk products with increased whey protein content, and mixtures thereof, infant formula and baby food with reduced total protein content. In an embodiment, the milk-based product is an infant formula. The protein content of the infant formula is typically in the range of about 1% to about 1.5%. In an embodiment, the protein content is about 1.2% to about 1.3%. The casein content of the infant formula is typically less than about 50% of total protein. In an embodiment, the infant formula prepared by the method of the invention has a protein content in the range of about 1% to about 1.5% and a casein content of less than 50% of total protein. In another embodiment, the infant formula prepared by the method of the invention has a protein content in the range of about 1.2% to about 1.3 and a casein content of less than 50% of total protein.

In an embodiment, the method of the invention comprises a lactose hydrolysis step. In an embodiment, the lactose is hydrolyzed prior to heat-treatment step c). In another embodiment, the lactose is hydrolyzed after step c). In a further embodiment, the lactose is hydrolyzed both prior to and after step c).

In an embodiment, the milk-based product is low-lactose having a lactose content of at most 1%. In another embodiment, the milk-based product is lactose-free having a lactose content of at most 0.01%.

In an embodiment, the milk-based product prepared by the method of the invention is packaged in aseptic conditions.

The method of the invention can be a continuous process or a batch process.

The milk-based product prepared by the method of the invention can be dried to powder or further processed to other milk products, including fermented and sour milk products, such as yoghurt, fermented milk, viili, fermented cream, sour cream, quark, butter milk, kefir, dairy shot drinks and cream cheese, or ice cream.

The following examples are presented for further illustration of the invention without limiting the invention thereto. In the examples, following analysis methods were used:

Activity of plasmin: modified method of M. Korycka-Dahl, et al. (M. Korycka-Dahl, B. Ribadeau Dumas, N. Chene, J. Martal: Plasmin activity in milk, Journal of Dairy Science, 14 (1983), pp. 704-711).

SDS-PAGE: according to Laemmli (1970) by using 18% Criterion TGX Precast gels (Bio-Rad, USA). Protein bands were stained with Coomassie Brilliant Blue R-250 (Bio-Rad, USA) and compared with molecular weight markers (Precision Plus Protein standards, Bio-Rad, USA). (Laemmli, U.K. Cleavage of structural proteins during the assembly of the head of bacteriophage T4, Nature 227 (1970) 680-685).

Native whey protein: Size exclusion chromatography modified (Syvaoja, E.-L., Korhonen, H., Determination of colostral immunoglobulins by gel filtration chromatography, IDF Special issue 9404, International Dairy Federation, Bruessels (1994) 216-219). The content of native whey protein illustrates denaturation, i.e. chemical changes, of whey protein. High content of native whey protein indicates a low degree of denaturation and minor chemical changes of whey protein.

Furosine: according to the IDF standard (IDF 193:2004 (E)/ISO 18329:2004(E). Milk and milk products—Determination of furosine content—Ion-pair reverse-phase high-performance liquid chromatography method, 11 p.). Furosine describes the chemical changes caused by heat treatment to protein. The higher the furosine content more significant changes have happened to the protein.

Free tyrosine equivalent: as described by Matsubara et al. (Matsubara, H., Hagihara, B., Nakai, M., Komaki, T., Yonetani, T., Okunuki, K., Crystalline bacterial proteinase II. General properties of crystalline proteinase of Bacillus subtilis N', J. Biochem. 45 (4) (1958) 251-258). Free tyrosine equivalent method can be used to study the level of proteolysis in the product.

All percentages in the Examples are given on weight basis.

EXAMPLE 1

Separation of Milk by Membrane Filtrations

Skim milk was ultrafiltrated by a volumetric concentration factor (VCR) of 3.7 at about 10° C. The membrane used in the ultrafiltration was Koch HKF 131 from Koch Membrane Systems, Inc. Table 1 shows the compositions of skim milk and of the obtained milk protein concentrate, that is the ultrafiltration retentate.

Skim milk was microfiltrated at a temperature range from 10° C. to 15° C. at a pressure of less than 1.5 bar to concentrate casein in the microfiltration retentate. The membrane used in the microfiltration was Synder FR from Synder Filtration, Inc. The skim milk was first microfiltrated by a concentration factor of about 4. The microfiltration was then continued by means of diafiltration, in which tap water was added to the obtained microfiltration retentate in an amount equal to that of the obtained retentate. The microfiltration was continued until an equivalent amount of the obtained permeate, compared to the amount of added water, was discharged. The diafiltration step was repeated two times. Permeates obtained from the two diafiltration steps were combined and the combined mixture was ultrafiltrated at a temperature range from 10° C. to 15° C. using the Koch HKF 131 membrane to concentrate whey protein in the ultrafiltration retentate. The ultrafiltration was continued until a protein content of the retentate of 9% was reached.

The permeate of the ultrafiltration was concentrated by nanofiltration (membranes Desal DK, filtration temperature 10° C.) to concentrate lactose in the nanofiltration retentate so as to provide a total solids content (TS) of about 20% of the retentate.

The nanofiltration permeate obtained was concentrated by reverse osmosis (membranes Filmtec RO and filtration temperature about 10° C.) to concentrate minerals in the retentate. The filtration was continued until TS of the retentate was about 2.5%.

Table 1 shows the compositions of the various fractions obtained in the microfiltration, ultrafiltration, nanofiltration and reverse osmosis above. Table 1 further shows the composition of cream separated from the skim milk.

TABLE 1

|  | Skim milk | Cream | Milk protein concentrate | Casein Fraction | Whey protein fraction | Lactose fraction | Mineral fraction |
| --- | --- | --- | --- | --- | --- | --- | --- |
| Fat (%) | <0.1 | 38 | 0.2 | 0.1 | <0.1 | <0.1 | <0.1 |
| Total protein (%) | 3.5 | 2.0 | 12.0 | 9.2 | 8.9 | 0.5 | 0.2 |
| NPN* (%) | 0.2 | 0.2 | 0.2 | <0.1 | 0.2 | 0.4 | 0.2 |
| Whey protein (%) | 0.5 | 0.3 | 1.9 | 0.5 | 6.9 | <0.1 | <0.1 |
| Casein (%) | 2.8 | 1.5 | 9.8 | 8.7 | 1.7 | <0.1 | <0.1 |
| Casein/total protein | 0.80 | 0.80 | 0.81 | 0.94 | 0.19 | — | — |
| Lactose (%) | 4.6 | 2.8 | 4.2 | 0.6 | 2.7 | 18.0 | 0.4 |
| Ash (%) | 0.8 | 0.5 | 1.6 | 0.88 | 0.5 | 1.0 | 2.1 |
| Total solids (%) | 9.0 | 43.3 | 18.1 | 11.4 | 12.4 | 20.0 | 2.5 |

*non-nitrogen protein

Reference Example 2

Heat Treatments of Milk Products With a Native Casein/Total Protein Ratio of 0.80

Raw milk was pasteurized at 72° C. for 15 sec. After pasteurization, the raw milk was separated into cream and skim milk. The skim milk was heat-treated by direct steam infusion (UHT steam infusion plant from SPX, Denmark). Temperatures and time periods used in various heat treatments are illustrated in Table 2.

TABLE 2

|  | Temperature (° C.) | Time period (sec) |
| --- | --- | --- |
| A | 135 | 0.5 |
| B | 157 | 0.1 |
| C | 150 | 4 |

Inactivation of the plasmin enzyme in milk products treated with various heat treatments was studied. The milk products were packaged aseptically and stored at a cold temperature (<6° C.) and at a room temperature (about 21° C.). The basic components (protein, fat, lactose), furosine, plasmin, native (non-denaturated) whey protein, SDS page, and tyrosine equivalent prior to and after the above heat treatments were determined. The results are given in Table 3.

TABLE 3

|  | Raw milk (no heat treatment) | Pasteurized skim milk | A | B | C |
| --- | --- | --- | --- | --- | --- |
| Total protein (%) | 3.4 | 3.5 | 3.5 | 3.5 | 3.5 |
| Casein (%) | 2.7 | 2.8 | 2.8 | 2.8 | 2.8 |
| Casein/total protein | 0.8 | 0.8 | 0.8 | 0.8 | 0.8 |
| Fat (%) | 4.2 | <0.1 | <0.1 | <0.1 | <0.1 |
| Lactose (%) | 4.6 | 4.6 | 4.6 | 4.6 | 4.6 |
| Native whey protein (%) | 0.60 | 0.54 | 0.39 | 0.46 | 0.15 |
| Furosine (mg/kg) | 5 | 3 | 5 | 5 | 23 |
| Plasmin (μmol/gh) | 44 | 79 | 60 | 55 | 7 |

The results of Table 3 show that conventional pasteurization conditions (72° C., 15 sec) were not efficient enough to inactivate the plasmin enzyme of skim milk. Neither did heat treatment conditions "A" nor "B" inactivate the plasmin enzyme of skim milk having a natural casein/total protein ratio of 0.80. Only the heat treatment "C", i.e. 150° C., 4 sec, was severe enough to essentially inactivate the plasmin enzyme of skim milk. This phenomenon can also be seen from FIGS. 1 and 2. FIG. 1 is a SDS page of the pasteurized skim milk of Table 3. Lane 1 represents pasteurized skim milk which is heat-treated in accordance with the heat treatment "B" and stored at a room temperature for 50 days. Lane 2 represents respective heat-treated skim milk which is stored at <6° C. for 50 days. A significant portion of casein of the milk product is split into smaller molecules when stored at room temperature for 50 days (lane 1).

The results of Table 3 also show that the whey protein denaturation (amount of native whey protein) in milk B is low compared to the product C, which indicate minor chemical changes in milk due to the heat treatment used.

Figure 2:
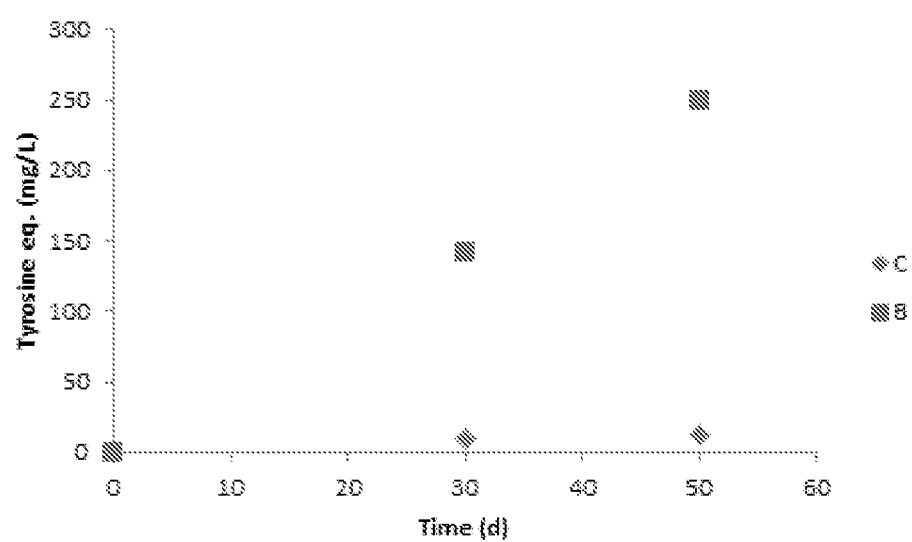
FIG. 2 shows a tyrosine content vs. storage time of heat-treated skim milk having a native casein/total protein ratio of 0.80.

FIG. 2 shows a tyrosine content vs. storage time of heat-treated skim milk. Significant proteolysis of the skim milk heat-treated in accordance with "B" and stored at an ambient temperature of 20° C. can be seen. No notable proteolysis of the skim milk heat-treated in accordance with "C" and stored at a room temperature was indicated.

High degree of proteolysis could also be proved by taste control. Milk product after 50 day storage at an ambient temperature, heat-treated according to "B", had a strong bitter taste.

Furosine level in milk C is at significantly higher level compared to other products. This indicates that chemical changes in product C are more significant due to the more severe heat treatment.

EXAMPLE 3

Milk Products of the Invention

Milk products with an altered casein/total protein ratio were prepared by a method of the invention. The membrane filtration fractions obtained in Example 1 were used in the preparation. The recipes and composition of the milk products are illustrated in Table 4. Composition of the milk-based product of the invention is calculated based on the composition of the milk fractions.

TABLE 4

|  | Skim milk | Cream | Milk protein concentrate | Whey protein concentrate | Water | Milk-based product of the invention |
| --- | --- | --- | --- | --- | --- | --- |
| Proportion (%) | 23.5 | 2.6 | 31.0 | 39.5 | 3.4 | 100 |
| Fat (%) | <0.1 | 38 | 0.2 | <0.1 | — | 1.0 |
| Total protein (%) | 3.5 | 2.0 | 12.0 | 8.9 | — | 8.1 |
| NPN (%) | 0.2 | 0.2 | 0.2 | 0.2 | — | 0.2 |
| Whey protein (%) | 0.5 | 0.3 | 1.9 | 6.9 | — | 3.6 |
| Casein (%) | 2.8 | 1.5 | 9.8 | 1.7 | — | 4.3 |
| Casein/total protein | 0.80 | 0.80 | 0.81 | 0.19 | — | 0.54 |
| Lactose (%) | 4.6 | 2.8 | 4.2 | 2.7 | — | 3.5 |
| Ash (%) | 0.8 | 0.5 | 1.6 | 0.5 | — | 0.88 |

The components were combined and thoroughly mixed. 0.12% (w/w) of a lactase enzyme (Maxilact LGX5000 from DSM) was added to the mixture. The mixture was allowed to be hydrolyzed for 20 hours at 5° C. The hydrolyzed mixture was divided into two batches. Both batches were heat-treated by direct steam infusion (UHT steam infusion plant from SPX, Denmark). The first batch was heat-treated at 135° C. for 0.5 sec (reference). The second batch was heat-treated at 157° C. for 0.1 sec in accordance with the invention. After the heat treatments, the batches were packaged aseptically. The packages were stored at a room temperature and at about 6° C.

Samples were taken from the hydrolyzed mixture before the heat treatment and from the two batches after the heat treatment. Contents of furosine, plasmin enzyme and native (non-denatured) whey protein of the two batches were analysed. The results are in Table 5.

TABLE 5

|  | Hydrolyzed mixture before heat treatment | 135° C., 0.5 sec | 157° C., 0.1 sec |
| --- | --- | --- | --- |
| Native whey protein (%) | 3.63 | 2.08 | 1.78 |
| Furosine (%) | 9 | 14 | 23 |
| Plasmin (µmol/gh) |  | 15 | 7 |

The results of Table 5 show that the plasmin activity of the hydrolyzed mixture heat-treated at 157° C. for 0.1 sec is significantly lower than that after the heat treatment at 135° C., 0.5 sec.

Figure 3:
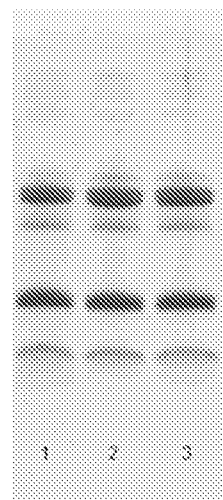
FIG. 3 is a SDS page showing protein profiles of a milk-based product prepared by a method of the present invention, and of a reference milk-based product after storage for 50 days.

FIG. 3 is a SDS page of the milk-based product of Table 4. Lane 1 represents a milk-based product which is heat-treated at 157° C. for 0.1 sec and stored at a room temperature for 50 days (invention). Lane 2 represents a milk-based product which is heat-treated at 157° C. for 0.1 sec and stored at 6° C. for 50 days (invention). Lane 3 represents a milk-based product which is heat-treated at 135° C. for 0.5 sec and stored at 6° C. for 50 days (reference). FIG. 3 shows the result which is expected from the plasmin activities shown in Table 5. No notable proteolysis of the milk-based product prepared by the method of the invention and stored at a room temperature was indicated. FIG. 3 further illustrates that the milk-based product prepared by the method of the invention shows a good preservability at a cold temperature.

Furosine content of both products was relatively low despite the high protein content and lactose hydrolysis carried out before heat treatment. Both factors typically lead to significantly elevated furosine content.

EXAMPLE 4

Fat-Free Milk Products With an Altered Casein/Total Protein Ratio and Elevated Protein Concentration of the Invention The membrane filtration fractions obtained in Example 1 were used for the preparation of milk products with altered proportion of casein to the total protein in accordance with the method of the invention. The recipes A, B and C, and calculated compositions of the milk products A, B and C, respectively, are illustrated in Table 6 and 7, respectively.

TABLE 6

| Ingredient | Recipe A | Recipe B | Recipe C |
|---|---|---|---|
| Skim milk (%) | 93.9 | 86.3 | 45.0 |
| Whey protein concentrate (%) | 6.1 | 13.7 | 31.0 |
| Casein concentrate (%) | — | — | 8.5 |
| RO retentate (%) | — | — | 5.1 |
| Water (%) | — | — | 10.4 |

TABLE 7

| Component | Product A | Product B | Product C |
|---|---|---|---|
| Fat (%) | <0.1 | <0.1 | <0.1 |
| Total protein (%) | 4.0 | 4.4 | 5.2 |
| NPN (%) | 0.2 | 0.2 | 0.2 |
| Whey protein (%) | 0.9 | 1.4 | 2.4 |
| Casein (%) | 2.7 | 2.6 | 2.5 |
| Casein/total protein | 0.68 | 0.60 | 0.48 |
| Lactose (%) | 4.5 | 4.4 | 3.1 |
| Ash (%) | 0.8 | 0.7 | 1.0 |

The components were combined and thoroughly mixed. The mixtures obtained were heat-treated by direct steam infusion (UHT steam infusion plant from SPX, Denmark) at 157° C. for 0.1 sec in accordance with the invention. After heating, the milk products were cooled and packed aseptically. The packages were stored at 6°C. and at room temperature.

The amount of total protein, native whey proteins, furosine content and plasmin activity in unheated and heat-treated mixtures are presented in Tables 8 and 9, respectively. The results clearly show that the addition of whey proteins and decreased ratio of casein to total protein content significantly decreased the plasmin activity of milk products after the heat-treatment. The furosine content remained low in milk products after the heat-treatment.

TABLE 8

| | Unheated | | |
|---|---|---|---|
| | Product A | Product B | Product C |
| Total protein (%) | 3.8 | 4.2 | 5.0 |
| Whey protein (%) | 0.9 | 1.4 | 2.4 |
| Furosine (mg/kg) | 5 | 7 | 7 |
| Plasmin activity (μmol/gh) | 60.2 | 48.5 | 29.8 |

TABLE 9

| | Heat-treated | | |
|---|---|---|---|
| | Product A | Product B | Product C |
| Total protein (%) | 3.7 | 4.1 | 4.8 |
| Native whey protein (%) | 0.7 | 1.1 | 1.7 |
| Furosine (mg/kg) | 6 | 7 | 11 |
| Plasmin activity (μmol/gh) | 36.1 | 22.2 | 0.0 |

Figure 4:
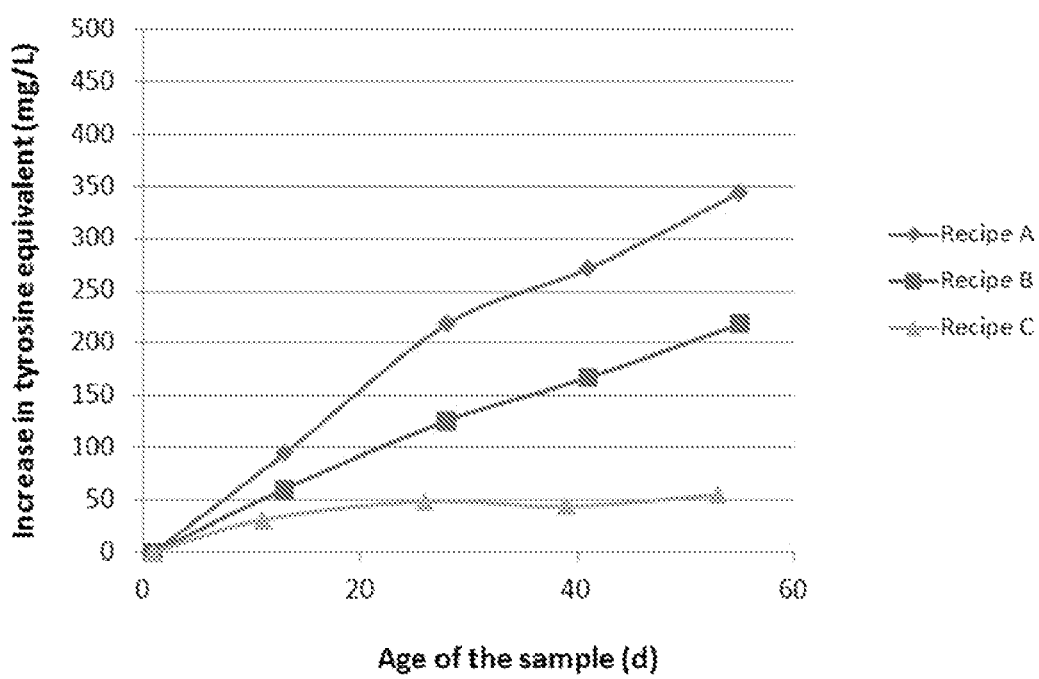
FIG. 4 shows proteolysis of milk-based products prepared by the method of the invention vs. storage time.
Figure 4:
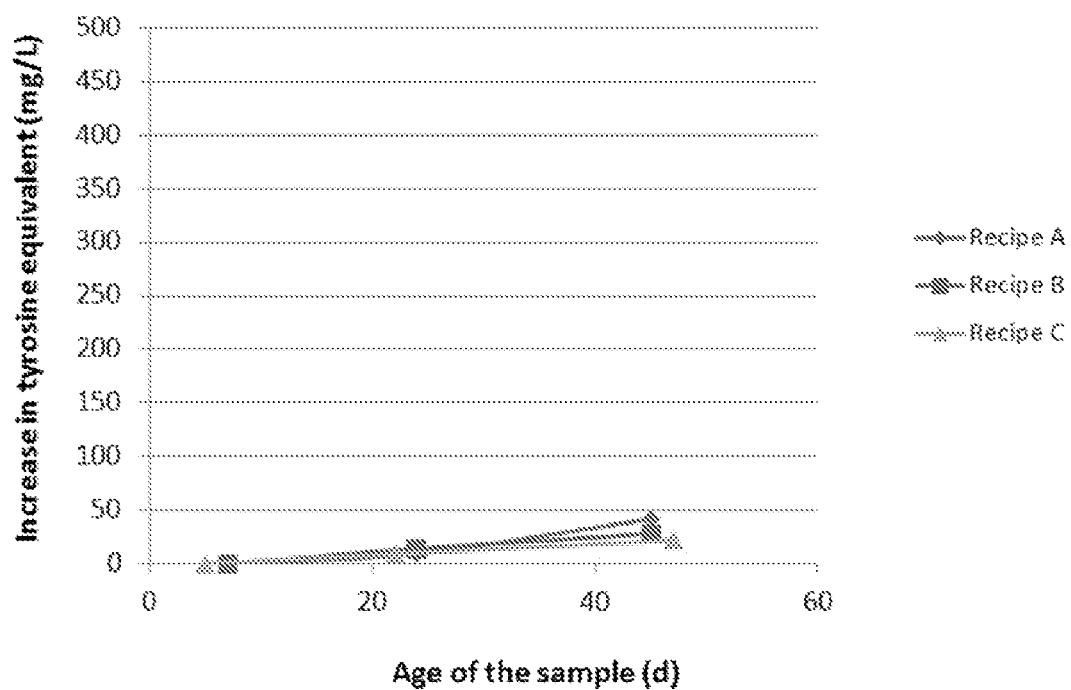

The amount of proteolysis during storage was evaluated by determining the tyrosine equivalent of the samples. The results are shown in FIG. 4. The increase in tyrosine equivalent decreased with decreasing ratio of casein to total protein content when samples were stored at room temperature. During cold storage, significant proteolysis could not be detected because the functioning of plasmin enzyme is considerably weaker at low temperatures as compared to a room temperature.

Organoleptic properties of the milk products A, B and C were also evaluated by a trained panel during storage. It was proved that the sensory quality of milk stored at cold remained good for 7 weeks of storage. The sensory quality of the milk products stored at room temperature depended on the ratio of casein to total protein content. The sensory quality of the milk product prepared by using the recipe C remained good for 6 weeks of storage. The sensory quality of milk products prepared by using recipes A and B remained good for 5 weeks.

EXAMPLE 5

Hydrolyzed Lactose-Free Milk Beverage With Elevated Whey Protein Content

Two milk products were produced from the membrane fractions obtained in Example 1 according to recipes A and B shown in Table 10.

TABLE 10

| | Recipe A | Recipe B |
|---|---|---|
| Whey protein fraction (%) | 7.4 | 12.7 |
| Casein fraction (%) | 9.9 | 5.9 |
| Skim milk (%) | 51.7 | 49.2 |
| Cream (%) | 3.9 | 3.9 |
| Mineral fraction (%) | 7.6 | 8.0 |
| Water (%) | 19.4 | 20.2 |
| Lactase enzyme (%) | 0.1 | 0.1 |
| Total | 100 | 100 |

The components were combined and thoroughly mixed. 0.1% (w/w) of a lactase enzyme (Maxilact LGX5000 from DSM) was added to the both products A and B. The products were allowed to be hydrolyzed for 20 hours at 5° C. Both batches were heat-treated by direct steam infusion (UHT steam infusion plant from SPX, Denmark) at 157° C. for 0.1 sec in accordance with the invention. After the heat treatments, the batches were packaged aseptically. The packages were stored at 21° C. for 66 days. Semi-skimmed milk of Table 12 was heat-treated similarly than products A and B.

Calculated compositions of the two milk products A and B are presented in Table 11. Lactose content means that before hydrolysis. Lactose content of the packaged milk products was analysed, and residual lactose of the two milk products after hydrolysis was <0.01%.

TABLE 11

| | Product A | Product B |
|---|---|---|
| Fat (%) | 1.5 | 1.5 |
| Total Protein (%) | 3.5 | 3.5 |
| NPN (%) | 0.2 | 0.2 |
| Whey protein (%) | 0.9 | 1.2 |
| Casein (%) | 2.5 | 2.2 |
| Casein/total protein | 0.70 | 0.60 |
| Lactose (%) | 2.8 | 2.8 |
| Ash (%) | 0.7 | 0.7 |

Contents of furosine, native whey protein, residual lactose, casein and NPN of the packaged milk products were analyzed and are given in Table 12.

TABLE 12

|  | Product A | Product B | Semi-skimmed milk |
|---|---|---|---|
| Total protein (%) | 3.5 | 3.5 | 3.5 |
| Native whey protein (%) | 0.55 | 0.84 | 0.4 |
| NPN (%) | 0.2 | 0.3 | 0.2 |
| Casein | 2.8 | 2.4 | 3.0 |
| Furosine (mg/kg) | 6 | 7 | 8 |
| Lactose (%) | <0.01 | <0.01 | <0.01 |

Chemical changes in milk due to the heat treatment are low.

Figure 5:
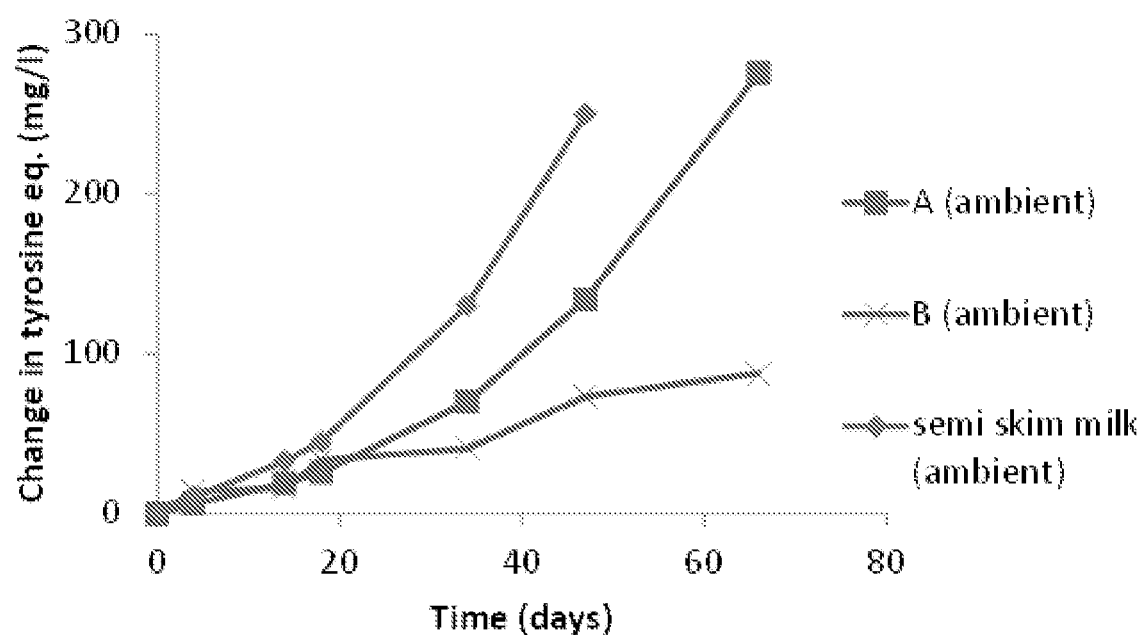
FIG. 5 shows proteolysis of milk-based products prepared by the method of the invention vs. storage time.

The proteolysis of the milk products A and B during shelf life is described in FIG. 5. Proteolysis of milk product B is very limited during the shelf life. Proteolysis of milk product A advanced faster but is still clearly lower than that of standard semi-skimmed milk.

Milk products A and B were compared in their organoleptic properties during the storage time. Semi-skimmed milk became bitter within 35 days. Product A turned bitter after 60 days whereas product B had not bitter taste after storage of 60 days.

EXAMPLE 6

Milk Product With Low Protein Concentration and Altered Casein/Total Protein Ratio of the Invention The membrane filtration fractions obtained in Example 1 were used for the preparation of milk product with altered proportion of casein to the total protein in accordance with the method of the invention. The recipe and calculated composition of the milk product are illustrated in Table 13 and 14, respectively. The composition is suitable for use as an infant formula.

TABLE 13

| Ingredient | Recipe |
|---|---|
| Skim milk (%) | 7.3 |
| Cream (%) | 5.3 |
| Whey protein concentrate (%) | 10.3 |
| Lactose concentrate (%) | 7.4 |
| Water (%) | 69.7 |

TABLE 14

| Component | Product A |
|---|---|
| Fat (%) | 2.0 |
| Total protein (%) | 1.3 |
| NPN (%) | 0.1 |
| Whey protein (%) | 0.8 |
| Casein (%) | 0.5 |
| Casein/total protein | 0.34 |
| Lactose (%) | 2.1 |
| Ash (%) | 0.2 |

The components were combined and thoroughly mixed. The mixture obtained was heat-treated by direct steam infusion (UHT steam infusion plant from SPX, Denmark) at 157° C. for 0.1 sec in accordance with the invention. After heating, the milk product was cooled and packed aseptically. The packages were stored at 6° C. and at room temperature.

The amount of total protein, whey protein, furosine content and plasmin activity in unheated and heat-treated mixture are presented in Tables 15 and 16, respectively. The results clearly show that the unheated mixture having a low ratio of casein to total protein content had very low plasmin activity. The heat-treated (157° C., 0.1 s) product had no plasmin activity. The furosine content remained low in milk product after the heat-treatment and minor whey protein denaturation occurred during the heat-treatment. Proteolysis was not detected during storage neither at cold nor at ambient temperature.

TABLE 15

| Unheated | |
|---|---|
|  | Product A |
| Total protein (%) | 1.2 |
| Whey protein (%) | 0.7 |
| Furosine (mg/kg) | 4 |
| Plasmin activity (μmol/gh) | 6 |

TABLE 16

| Heat-treated | |
|---|---|
|  | Product A |
| Total protein (%) | 1.2 |
| Native whey protein (%) | 0.6 |
| Furosine (mg/kg) | 6 |
| Plasmin activity (μmol/gh) | 0 |

It will be obvious to a person skilled in the art that, as the technology advances, the inventive concept can be implemented in various ways. The invention and its embodiments are not limited to the examples described above but may vary within the scope of the claims.

The invention claimed is:

1. A method for producing a milk-based product, comprising the steps of:
   a) providing a milk raw material;
   b) altering a ratio of casein to total protein of the milk raw material to less than about 0.80;
   c) subjecting the milk raw material with the altered ratio of casein to total protein from step b) to a heat treatment at the temperature of at least 150° C. for a period of at most 0.3 sec to inactivate plasmin enzyme in the raw milk material;
   d) cooling the heat-treated milk raw material from step c) to provide the milk-based product.

2. The method of claim 1, wherein the heat treatment is performed for a period of at most 0.2 sec.

3. The method of claim 1, wherein the milk raw material is selected from a group consisting of full-fat milk, cream, low-fat milk, skim milk, ultrafiltered milk, diafiltered milk, microfiltered milk, lactose-free or low-lactose milk, protease treated milk, recombined milk from milk powder, whey and combination thereof.

4. The method of claim 1, wherein the milk raw material of step a) is subjected to pasteurization at 72° C. for 15 sec.

5. The method of claim 1, wherein the milk raw material with the altered ratio of casein to total protein is selected from the group consisting of a whey protein concentrate, skim milk, cream, a milk protein concentrate, and mixtures thereof.

6. The method of claim 5, wherein milk protein concentrate is in the form of an ultrafiltration retentate obtained from ultrafiltration of milk.

7. The method of claim 5, wherein the whey protein concentrate is obtained by a method comprising the steps:
   i) subjecting milk to microfiltration (MF) to provide a MF permeate and a MF retentate;
   ii) subjecting the MF permeate to ultrafiltration (UF) to provide a UF permeate and the whey protein concentrate as a UF retentate.

8. The method of claim 7, wherein a pore size of the microfiltration membrane is about 0.08 µm.

9. The method of claim 7, wherein microfiltration and/or ultrafiltration are/is performed by using diafiltration.

10. The method of claim 1, wherein a protein content of the milk-based product is at least of 0.9%.

11. The method of claim 1, wherein the milk-based product has a ratio of casein to total protein of less than 0.80.

12. The method of claim 1, wherein the milk-based product has an increased protein content up to about 20% and an altered casein/total protein ratio of about 0.70.

13. The method of claim 1, wherein the milk-based product has a protein content of about 3% of normal milk and altered casein/total protein ratio of about 0.70.

14. The method of claim 1, wherein the milk-based product has a reduced protein content down to about 0.9% and an altered casein/total protein ratio of about 0.40.

15. The method of claim 1 for preparing an infant formula.

16. The method of claim 15, wherein the protein content of the infant formula in the range of about 1% to about 1.5%.

17. The method of claim 15, wherein the casein content of the infant formula is less than 50% of total protein.

18. The method of claim 1, further comprising a lactose hydrolysis step.

19. The method of claim 18, wherein the lactose hydrolysis step is performed prior to step c) and/or after step c).

20. A method for producing a milk-based product, comprising the steps of:
   a) providing a milk raw material;
   b) subjecting the milk raw material to microfiltration (MF) to provide a MF permeate and a casein concentrate as a MF retentate;
   c) subjecting the MF permeate to ultrafiltration (UF) to provide a UF permeate and a whey protein concentrate as a UF retentate;
   d) combining the casein concentrate with the whey protein concentrate, skim milk, milk minerals and water to provide a milk mixture with a ratio of casein to total protein of less than 0.80,
   e) subjecting the milk mixture to a heat treatment at the temperature of at least 150° C. for a period of at most 0.3 sec to inactivate plasmin enzyme in the raw milk material;
   f) cooling the milk mixture after the heat treatment to provide a milk-based product with no plasmin activity.

21. The method of claim 20, wherein the heat treatment is carried out at 157° C. for 0.1 sec.

22. A method for producing a milk-based product, comprising the steps of:
   a) providing a milk raw material;
   b) subjecting the milk raw material to microfiltration (MF) to provide a MF permeate and a casein concentrate as a MF retentate;
   c) subjecting the MF permeate to ultrafiltration (UF) to provide a UF permeate and a whey protein concentrate as a UF retentate;
   d) combining the whey protein concentrate with skim milk, cream, a lactose concentrate and water to provide a milk mixture with a ratio of casein to total protein of less than 0.80,
   e) subjecting the milk mixture to a heat treatment at the temperature of at least 150° C. for a period of at most 0.3 sec to inactivate plasmin enzyme in the raw milk material;
   f) cooling the milk mixture after the heat treatment to provide the milk-based product with no plasmin activity.

23. The method of claim 22, wherein the heat treatment is carried out at 157° C. for 0.1 sec.

* * * * *